United States Patent [19]

Gladieux et al.

[11] 4,135,906

[45] Jan. 23, 1979

[54] SHEET HEAT TREATING FURNACE

[75] Inventors: Norman K. Gladieux, Oregon; Richard A. Herrington, Walbridge; Waldemar W. Oelke, Rossford, all of Ohio

[73] Assignee: Libbey-Owens-Ford Company, Toledo, Ohio

[21] Appl. No.: 845,867

[22] Filed: Oct. 27, 1977

[51] Int. Cl.² .............................................. C03B 25/04
[52] U.S. Cl. ........................................ 65/348; 65/350; 432/64; 432/145
[58] Field of Search .................. 65/349, 350, 348, 351; 432/64, 126, 145, 185

[56] References Cited

U.S. PATENT DOCUMENTS

| 2,819,889 | 1/1958 | Dany ........................................ 432/64 |
| 3,957,479 | 5/1976 | McMaster et al. ...................... 65/350 |
| 4,006,002 | 2/1977 | Hetman, Jr. ............................. 65/349 |

*Primary Examiner*—Arthur D. Kellogg
*Attorney, Agent, or Firm*—Collins, Oberlin & Darr

[57] ABSTRACT

A furnace for heat treating vertically depending sheet material moving through an enclosed heating chamber, the furnace having entrance and exit openings in opposed end walls and a slot in the roof extending between the openings. The depending sheet material moves through the heating chamber suspended from a trolley supported above the slot, which trolley has hanger rods projecting through the slot. The entrance and exit openings are closed by doors, and an air curtain directed across the slot provides a pressure barrier which, together with the doors, prevents the flow of heated gases from and within the heating chamber.

4 Claims, 5 Drawing Figures

SHEET HEAT TREATING FURNACE

BACKGROUND OF THE INVENTION

1. Field of the Invention

This invention generally relates to heat treating furnaces, and more particularly to a sheet material heating furnace having a slot extending the length of the roof through which tongs supporting the sheet material move, and a seal for the slot.

2. Description of the Prior Art

It is common practice in the heating of sheet material to suspend the sheet from one of its edges in a vertical plane so that both of its surfaces may be heated, and move the sheet through the heating chamber of a furnace. For example, in the tempering of glass sheets, the sheets are ordinarily suspended in a vertical plane from their upper edges by tongs and passed horizontally through a tunnel-type furnace wherein the glass sheets are heated to a temperature approximating their softening point.

Furnaces employed in the above-mentioned process usually are of the type having an elongated heating chamber wherein the roof is provided with a slot extending lengthwise of the furnace and opening into opposed entrance and exit openings provided in the furnace walls. Such furnaces, which may be of either the straight-through or the circular type, generally have a track suspended above the slot and outwardly of the roof on which a carrier is movably supported. The carrier normally includes hanger rods which project through the slot for supporting a horizontally disposed supporting bar from which tongs are hung to suspend the sheets within the heating chamber of the furnace. Examples of such prior art furnace structures are disclosed in U.S. Pat. Nos. 2,115,106, issued on Apr. 26, 1938; 2,197,550, issued on Apr. 16, 1940; 2,272,966, issued on Feb. 10, 1942 and 3,957,479, issued on May 18, 1976.

In the heating of sheet materials in the above-described furnaces, difficulty has been encountered in achieving uniform temperature in the sheets inasmuch as different portions thereof may be exposed to uneven temperatures due to the so-called "chimney effect" created by the open slot, which produces a variable flow of hot gases throughout the heating chamber. The uneven temperatures consequently resulting in different portions of the sheets produce stresses therein causing warpage and/or in the case of glass, breakage of the sheet material.

Efforts have been made in the past to prevent the setting up of these undesirable temperature conditions in the heating chamber, and also to prevent undue loss of heat therefrom, by closing or sealing the slot in the roof of the furnace, but heretofore no entirely satisfactory closure has been found. Attempts have been made to seal the slot by closures which open up as the sheet traverses the furnace. For example, in the aforementioned United States patents, U.S. Pat. No. 2,115,106 discloses a slot in the furnace roof which is closed by a pair of asbestos strips while in U.S. Pat. No. 2,197,550, two series of transversely extending asbestos fingers are pivotally mounted on the roof of the furnace over the slot with their inner ends engaging each other. However, in both cases the slot is open to the environment surrounding the furnace as the carrier apparatus moves along the slot.

Also, attempts have been made to provide the slot with closures which do not open as a carrier traverses the slot. In the previously mentioned United States patents, U.S. Pat. No. 2,272,966 shows the slot to be closed by a series of mechanical plates which move with the carrier apparatus and in U.S. Pat. No. 3,957,479, the slot is closed by a housing which surrounds and overlies the slot and carrier apparatus and wherein cooling air is admitted to the housing for cooling the bearings employed in the carrier. However, the structures of these closures are complex, expensive to manufacture and difficult to maintain.

SUMMARY OF THE INVENTION

Generally stated, the present invention overcomes the aforedescribed disadvantages by providing a furnace having an open slot in its roof, with a regulated air curtain directed across and extending along the length of the slot which effectively bars the egress of heated gases from the interior of the furnace and the ingress of cooler ambient air into the interior of the furnace; the air curtain permitting sealed movement of the hanger rods projecting through the slot. More specifically, each wall defining the slot in the roof is provided with a housing defining a dual compartment plenum chamber which extends the length of the slot and overlies the tops of the entrance and exit doors of the furnace. Air is supplied under pressure to one compartment of each housing, metered into the other compartment thereof, and discharged through orifices facing the discharge orifices in the opposite housing.

OBJECTS AND ADVANTAGES

An object of this invention is to provide an open slot in the top of a furnace with a novel device for effectively sealing the slot at all times, while permitting ready passage of a sheet supporting means.

Another object of this invention is to provide an open slot in the top of the furnace with a novel sealing means which prevents the escape of heated gases from the furnace heating chamber as well as the ingress of cooler ambient air into the heating chamber, in order to maintain constant temperature conditions therein for uniformly heating the sheet material.

Yet another object of this invention is to provide an open slot in the top of a furnace with an air curtain which exhibits uniform pressure along its length and permits the movement of sheet supporting rods along the slot while effectively preventing the passage of gases into or from the furnace through the slot.

Other objects and advantages will become more apparent during the course of the following description, when taken in connection with the accompanying drawings.

BRIEF DESCRIPTION OF THE DRAWINGS

In the drawings wherein like numerals are employed to designate like parts throughout the same.

DESCRIPTION OF THE PREFERRED EMBODIMENT

Figure 1:
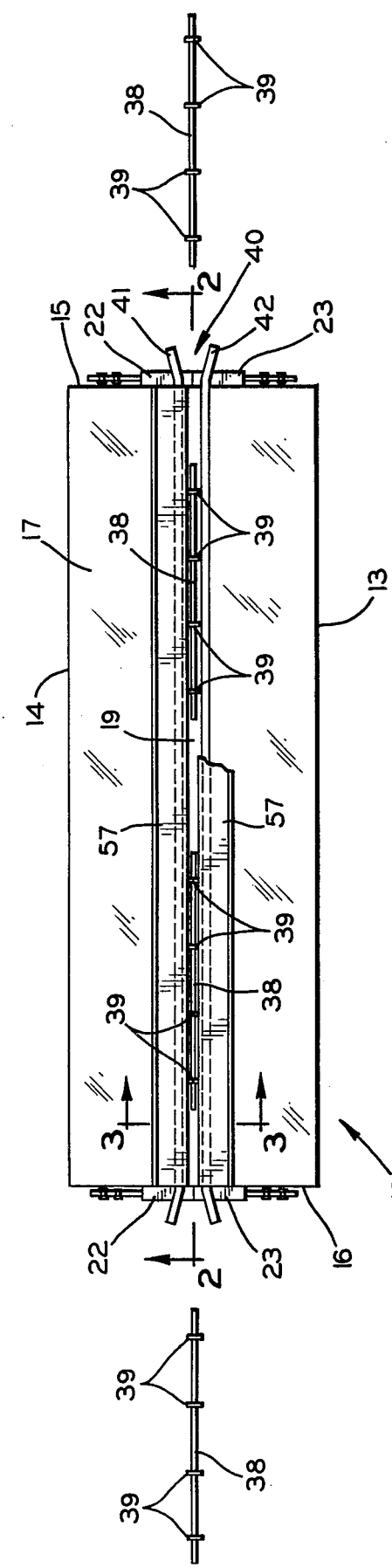
FIG. 1 is a top plan view of a straight-through tunnel-type furnace embodying the present invention.
Figure 3:
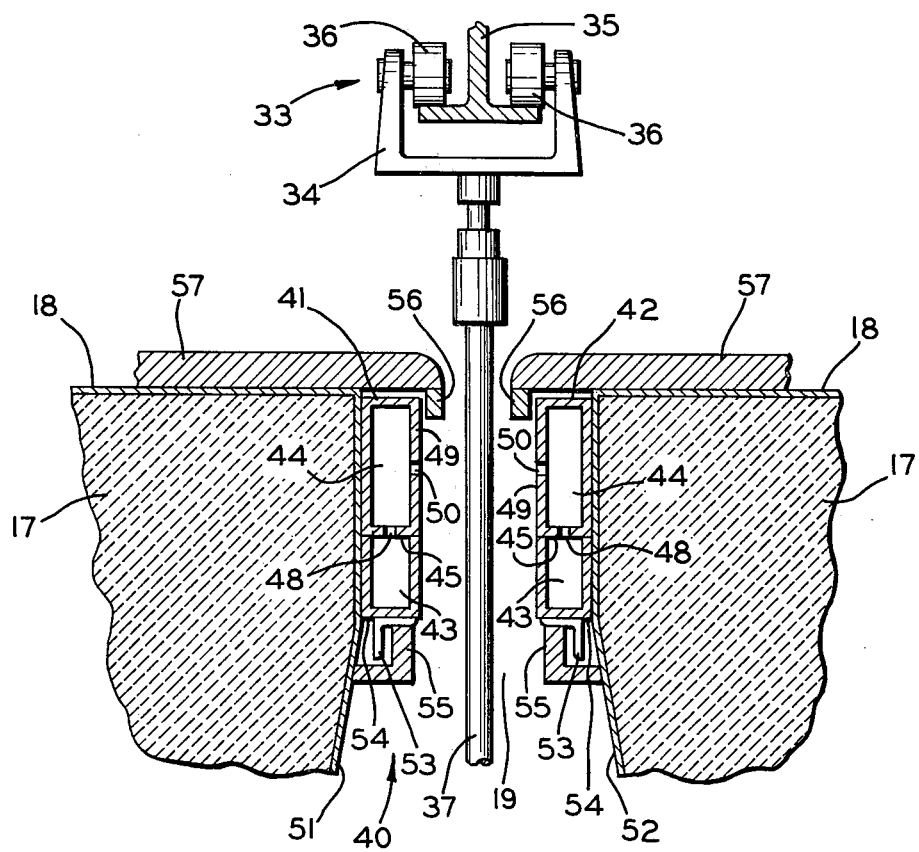
FIG. 3 is an enlarged, fragmentary, cross sectional view, taken substantially along line 3—3 of FIG. 1.
Figure 4:
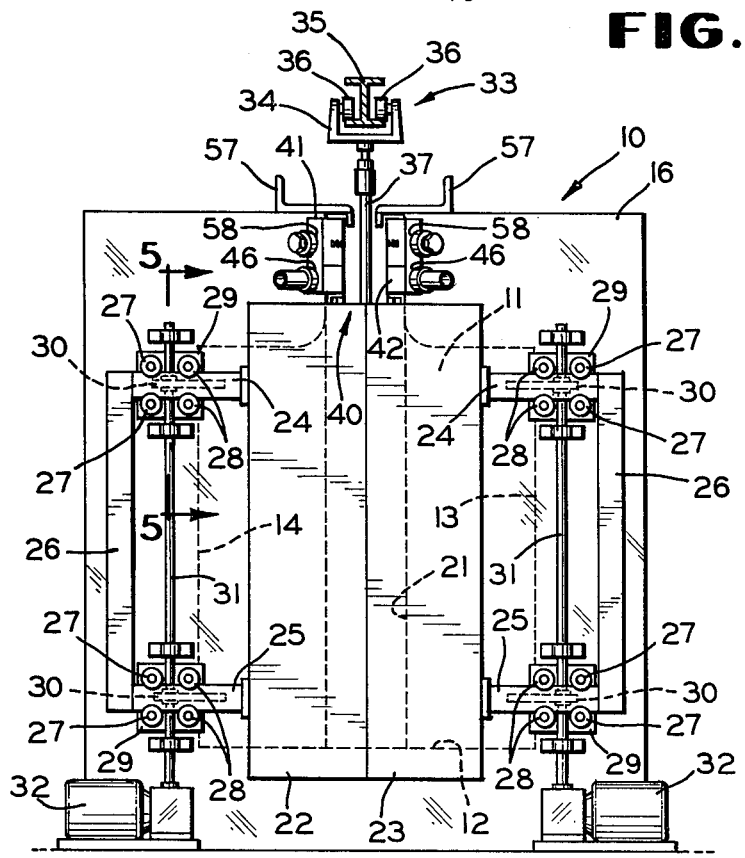
FIG. 4 is an enlarged end view of the furnace illustrated in FIG. 1.

Referring particularly to FIGS. 1 and 4, there is illustrated one type of furnace designated in its entirety by the reference numeral 10 which may be used for heating each side of vertically depending sheet material to a desired temperature. Preferably, the furnace 10 is of the tunnel-type and generally of rectangular shape in cross section. The construction of the furnace 10 is best illustrated in FIG. 4 and comprises an enclosed heating chamber 11 defined by a floor 12, side walls 13 and 14, end walls 15 and 16 and a roof 17, all composed of a refractory material covered by a metallic skin 18 (see FIG. 3). The heating chamber 11 can be heated in any desired manner by suitable heating elements (not shown) such as electrical heating elements, for example, located in each of the side walls 13 and 14. Such heating elements are suitably controlled by apparatus (also not shown) to obtain the desired temperature at various points in the heating chamber 11. The roof 12 of the furnace is provided with a slot 19 extending longitudinally between entrance and exit openings 20 and 21 provided in the end walls 15 and 16, respectively, for the passage of sheet material (not shown) through the heating chamber 11.

Each end wall 15 and 16 of the furnace is provided with a pair of sliding doors 22 and 23 for closing the entrance and exit openings 20 and 21. The doors 22 and 23 are composed of refractory material and sealed to minimize the loss of heated air from and the ingress of cooler ambient air into the heating chamber 11, particularly during the heating of the sheet materials. The pairs of sliding doors 22 and 23 at each end of the furnace are identical, thus a description of one of the pairs of doors will suffice for the other.

Figure 5:
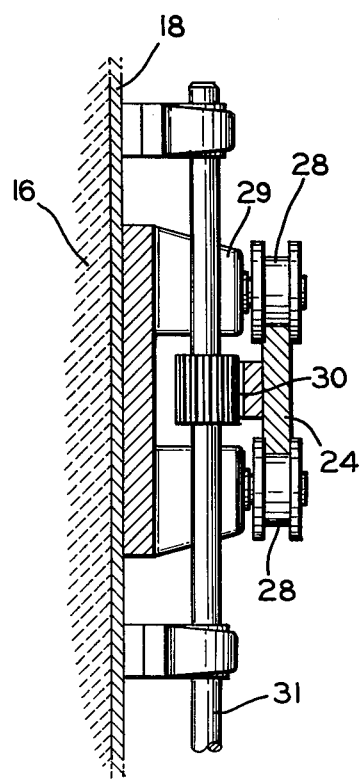
FIG. 5 is an enlarged, fragmentary cross sectional view of the door operating mechanism shown in FIG. 4.

Referring now to FIGS. 4 and 5, each door 22 and 23 is provided with upper and lower horizontal mounting arms 24 and 25, respectively, the outer ends of which are rigidly secured together by a vertical tie bar 26. Each horizontal mounting arm 24 and 25 is movedly supported between cooperating pairs of spaced apart grooved rollers 27 and 28 which are rotatably mounted on a bracket 29 fixedly secured to the end wall 16 of the furnace 10. Each door 22 and 23 is moved between its open and closed position by a pair of rack and pinion devices 30, one being connected to each of the mounting arms 24 and 25. The rack and pinion devices 30 for each door are operatively connected together by a common drive shaft 31 rotatably driven by a motor 32.

Referring now to FIGS. 3 and 4, the sheet materials are supported from a carrier apparatus, designated in its entirety by the reference numeral 33, arranged outwardly of the furnace roof 17 and movable thereby along the slot 19. The sheet materials are heated in a controlled manner to the desired temperature in the heating chamber 11 during their passage therethrough.

The carrier apparatus 33 includes a carriage 34 which is mounted for movement along a monorail 35 extending longitudinally above the slot 19 in the roof 17 of the furnace. The carriage 34 is provided with opposed pairs of wheels 36 which run along the monorail 35. Secured to the carriage 34 are vertically depending hanger rods 37 (only one shown) which support a longitudinally extending horizontally disposed tong bar 38 (see FIG. 1). Mounted upon the tong supporting bar 38 are a plurality of relatively small tongs 39 which engage the opposite faces of the sheet materials adjacent their upper edges. As clearly illustrated in FIGS. 1, 3 and 4, the monorail 35 and the carriage 34 are arranged above and outwardly of the roof 17 of the furnace and the hanger rods 37 depend downwardly through the slot 19 to support the tong bar 38 within the heating chamber 11.

In order to prevent the escape of heated gases and also in order to minimize disturbance of the predetermined temperature conditions in the heating chamber 11, it is essential that the slot 19 be sealed. The primary purpose of this invention, therefore, is to provide a continuous seal for the slot 19 and yet permit ready passage of the hanger rods 37 therealong. Thus, in accordance with this invention the slot 19 is provided with a novel perforated chamber device 40 adapted to create a continuous seal across the slot throughout its entire length. This is accomplished by producing a regulated-pressure air curtain across the slot 19 which continuously seals the slot even when the hanger rods 37 pass therealong.

Figure 2:
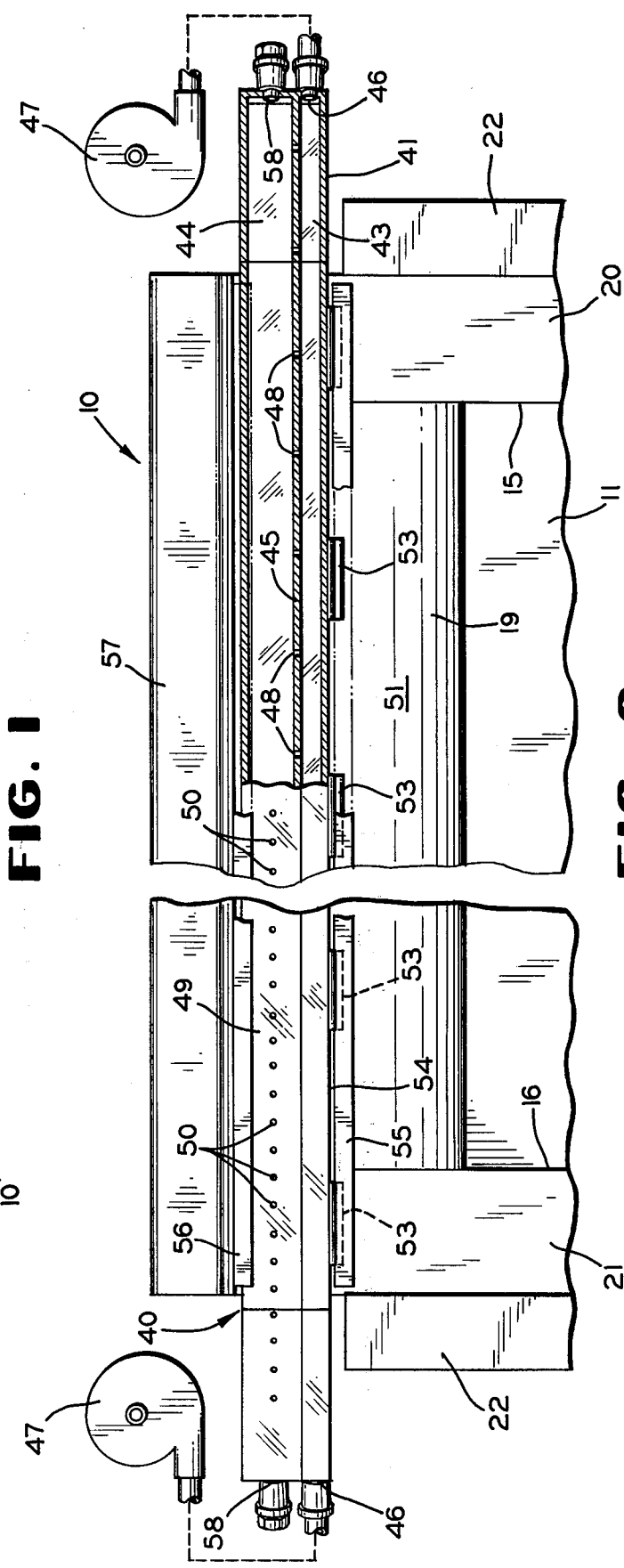
FIG. 2 is an enlarged, fragmentary view taken substantially along line 2—2 of FIG. 1.

As best illustrated in FIGS. 1 and 2, a pair of housings 41 and 42 is provided in the slot 19 to produce the air curtain extending thereacross. Each of the housings 41 and 42 defines a plenum chamber. The housings are similar in construction and their mounting in the slot 19 is identical so that a description of one will suffice for the other. As best illustrated in FIG. 3, each of the housings 41 and 42 comprise an elongated tubular element having a substantially rectangular shape in cross section and which is divided into a first, or lower, plenum chamber 43 and a second, or upper, plenum chamber 44 by an intermediate wall 45. Preferably, each end of the lower chamber 43 is provided with an inlet port 46 which is connected to a blower device 47 for supplying the lower chamber with a flowing volume of air under pressure. This arrangement permits the flowing volume of air to be uniformly distributed throughout the relatively long lower plenum chamber 43, which is generally over twenty (20) feet in length. The wall 45 is provided with a first series of orifices 48 comprising apertures extending longitudinally along the length thereof for regulating the pressure of the air being supplied to the upper chamber 44. The outer sides 49 of the upper plenum chambers 44 are provided with a second series of oppositely directed orifices 50 comprising apertures extending longitudinally along the length thereof and beyond each end wall 15 and 16 of the furance for discharging air from the chambers 44 across the width of the slot 19. The upper chambers 44 may be provided with normally closed ports 58 through which the pressure thereof may be measured.

Referring now to FIGS. 2 and 3, the housings 41 and 42 are loosely supported on walls 51 and 52, respectively, defining the slot 19 at the upper edges thereof so that they may expand and contract with changes in furnace temperature. More specifically, depending flanges 53 affixed to the bottom wall 54 of the housings 41 and 42 loosely engage an elongated bracket 55 affixed to metallic skin 18 covering the walls 51 and 52 defining the slot 19. The upper edge of each housing 41 and 42 is retained in position by an elongated depending flange 56 of an angle member 57 extending longitudinally along the slot 19 on the roof 12. This construction permits the housings to freely expand and contract in accordance with any change in temperature of the furnace.

This particular arrangement reduces the width of the slot and provides a narrow, and thus a more effective, air curtain barring the escape of heated gases from the heating chamber 11. As a result, the air curtain provides a more effective barrier as the hanger rods 37 pass along the slot 19, thus more uniformly and accurately maintaining the desired temperature conditions within the heating chamber.

In operation, air under pressure is admitted into the lower plenum chamber 43 through the inlet ports 46 and metered into the upper chamber 44, thus eliminating fluctuations in the volume of moving air from the lower chamber. Accordingly, a constant volume of air under pressure is directed from the upper chamber 44 through the discharge orifices 50, maintaining a uniform air curtain across the slot 19. Preferably, the discharge orifices 50 are greater in number than the metering orifices 48 so that the velocity of air flowing from the discharge orifices is uniform and constant along the length of, as well as across, the slot 19. Consequently, a continuous constant air curtain confines the heated gases within the heating chamber by preventing them from flowing upwardly through the slot. In practice, it has been found that with a sealing device about 20 feet in length, air flowing from the blowers 47 at 160 cfm and 8 psi into the lower chamber 43 can be metered through about seventy-two (72) evenly spaced 1/16 inch diameter orifices 48 into the upper chamber so as to create in the upper chamber a pressure equivalent to a two inch column of water which will provide an air flow from about two hundred and sixty-seven (267) evenly spaced 1/16 inch diameter orifices 50 which is adequate to establish an air curtain to operate the furnace at a slight positive pressure.

It is to be understood that the form of the invention herewith shown and described is to be taken as an illustrative embodiment only of the same, and that various changes in the shape, size and arrangement of the parts may be resorted to without departing from the spirit of the invention.

We claim:

1. In a furnace having a heating chamber for heat treating sheet material moving therethrough and a slot of substantial elongation in its roof opening into the heating chamber whereby sheet material is suspended in a vertical plane from a support projecting through the slot, and including apparatus for establishing a barrier across the slot for preventing escape of hot gases from the interior of the furnace, said apparatus comprising:
   a. a pair of elongated housings, each of said housings being mounted in the slot and attached to the side walls defining the slot so as to extend the length thereof;
   b. an intermediate wall disposed within and throughout the length of each said housing separating the interior of each said housing into at least a first elongated chamber and a second elongated chamber;
   c. means for supplying pressurized fluid to said first chamber of each said housing;
   d. first orifice means extending throughout the length of said intermediate wall for regulating the flow of pressurized fluid from said first chamber to said second chamber in each said housing to create substantially uniform pressure in said fluid throughout the length of said second chamber; and
   e. second orifice means for discharging the regulated pressurized fluid from said second chamber of each said housing across the slot towards the opposed one of said pair of housings whereby the opposed flows of pressurized fluid form a uniform barrier resisting escape of hot gases from the heating chamber of the furnace.

2. A furnace of the type having a slot in the roof thereof as claimed in claim 1, wherein said first orifice means comprises a series of apertures defined by said intermediate wall and extending longitudinally along the length thereof for regulating the pressure of the fluid passing from said first chamber to said second chamber.

3. A furnace of the type having a slot in the roof thereof as claimed in claim 1 or 2, wherein said second orifice means comprises a series of apertures defined by and extending longitudinally along the length of the external wall of said second chamber.

4. A furnace of the type having a slot in the roof thereof as claimed in claim 1, wherein each said housing is floatingly attached to the walls defining the slot by means comprising an elongated bracket fixedly attached to each of the side walls defining the slot and flanges depending from the bottom of said housings which loosely engage said brackets for accommodating expansion and contraction of said housings due to temperature changes.

* * * * *